United States Patent Office 2,723,190
Patented Nov. 8, 1955

2,723,190

ORGANIC SULFUR COMPOUNDS AND HERBICIDES CONTAINING SAME

Arthur H. Schlesinger, Dayton, Ohio, assignor to Monsanto Chemical Company, St. Louis, Mo., a corporation of Delaware No Drawing. Application September 26, 1951,
Serial No. 248,464

6 Claims. (Cl. 71—2.5)

The present invention relates to heterocyclic organic compounds of sulfur and more particularly provides a series of hitherto unknown (alkoxymethyl)thianaphthene-1,1-dioxides, methods of preparing the same, herbicidal compositions comprising the new compounds, and methods of destroying undesirable plants, in which methods the present herbicidal compositions are employed.

According to the invention there are provided 3-(alkoxymethyl)thianaphthene-1,1-dioxides having the formula

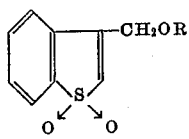

in which R is an alkyl radical of from 1 to 5 carbon atoms. Examples of compounds having the above formula are 3-(methoxymethyl)thianaphthene - 1,1 - dioxide, 3-(propoxymethyl)thianaphthene - 1,1 - dioxide, 3-(isobutoxymethyl)thianaphthene-1,1 - dioxide, 3 - (n-amyloxy)thianaphthene-1,1-dioxide, etc.

The 3 - (alkoxymethyl)thianaphthene - 1,1 - dioxides are readily prepared by contacting the corresponding 3-(alkoxymethyl)thianaphthenes with hydrogen peroxide at ordinary or increased temperatures and in the presence or absence of an inert solvent or diluent. Advantageously, reaction is effected in the presence of an unreactive solvent medium such as glacial acetic acid, dioxane, acetone, methyl ethyl ketone, etc., and temperatures of from, say, 50° C. to the refluxing temperature of the reaction mixture are used. The 3-(alkoxymethyl)thianaphthenes are easily obtainable by reaction of 3-chloromethylthianaphthene with an aliphatic saturated alcohol of from 1 to 5 carbon atoms in the presence of an inorganic basic catalyst, substantially as described in my copending application Serial No. 248,467 filed of even date.

The present 3 - (alkoxymethyl)thianaphthene-1,1-dioxides are well defined, stable compounds which may be advantageously employed for a variety of industrial and agricultural purposes. They are particularly valuable as herbicides, but some of this series of compounds also may be advantageously employed as insecticides and pesticides in general, as intermediates in manufacture of pharmaceuticals, etc.

The invention is further illustrated, but not limited, by the following examples.

Example 1

A mixture consisting of 20.0 g. of 3-(methoxymethyl)-thianaphthene, 68 ml. of 30% hydrogen peroxide and 100 ml. of glacial acetic acid was carefully brought to a temperature of 70° C., at which temperature external cooling was necessary in order to mitigate the vigorous exothermic reaction. The mixture was then heated to 106° C. and held at this temperature for 20 minutes. The whole was allowed to cool, and then poured into water. After allowing the resulting mixture to stand, the solid which formed was filtered off. This was recrystallized from ethanol to give 12.8 g. (54% theoretical yield) of pale yellow crystals of the substantially pure 3-(methoxymethyl)thianaphthene-1,1-dioxide, M. P. 145–7° C. and analyzing as follows:

|  | Found | Calcd. for $C_{10}H_{10}O_3S$ |
|---|---|---|
| Percent C | 56.98 | 57.1 |
| Percent H | 4.60 | 4.76 |

Example 2

Spray testing of the herbicidal activity of the above 3-(methoxymethyl)thianaphthene-1,1-dioxide was conducted as follows:

A 1% aqueous suspension of the thianaphthene compound was prepared, employing 0.2% of an emulsifying agent known to the trade as "Emulsifier L" and comprising a mixture of a polyethylene glycol derivative and an alkylbenzenesulfonate. Three week-old corn and bean plants were sprayed with the aqueous suspension, two plants of each variety being employed. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The leaves of the treated corn were dried and the plants were severely injured by the spray, whereas the bean plants showed only moderate injury.

The present 3-(alkoxymethyl)thianaphthene - 1,1 - dioxides are generally incorporated into inert carriers when employed as herbicidal compositions, since they are active in only very small concentrations. They are preferably applied by spraying aqueous suspensions or oil emulsions of the same, this method affording an easy and inexpensive way of destroying plant growth. Dispersing or emulsifying agents are advantageously employed in the preparation of the herbicidal suspensions or emulsions. However, the 3-(alkoxymethyl)thianaphthene-1,1-dioxides are likewise effective when applied in agricultural dusts; or they may be used with water-insoluble insecticides, fungicides, etc., in customarily employed organic solutions. Solid carriers which may be used include, e. g., clay, talc, pumice, bentonite, etc.

What we claim is:

1. Compounds having the formula

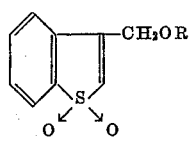

in which R is an alkyl radical of from 1 to 5 carbon atoms.

2. 3-(methoxymethyl)thianaphthene-1,1-dioxide.

3. The process which comprises contacting with hydrogen peroxide a 3-(alkoxymethyl)thienaphthene having the formula

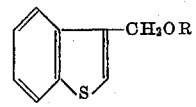

in which R is an alkyl radical of from 1 to 5 carbon atoms.

and recovering from the resulting reaction product a compound having the formula

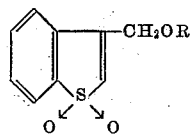

in which R is an alkyl radical of from 1 to 5 carbon atoms.

4. The process which comprises heating 3-(methoxymethyl)-thianaphthene with hydrogen peroxide while dissolved in glacial acetic acid and recovering 3-(methoxymethyl)thianaphthene-1,1-dioxide, from the resulting reaction product.

5. A herbicidal composition comprising an inert carrier, and as the essential active ingredient an (alkoxymethyl)thianaphthene-1,1-dioxide having the formula in which R is an alkyl radical of from 1 to 5 carbon atoms.

6. A herbicidal composition comprising an inert carrier and 3-(methoxymethyl)thianaphthene-1,1-dioxide as the essential active ingredient.

References Cited in the file of this patent

UNITED STATES PATENTS

| | | |
|---|---|---|
| 2,287,102 | Basel | June 23, 1942 |
| 2,478,914 | Greensfelder et al. | Aug. 16, 1949 |
| 2,556,664 | Smith | June 12, 1951 |
| 2,557,673 | McKellin et al. | June 19, 1951 |